Patented July 18, 1950

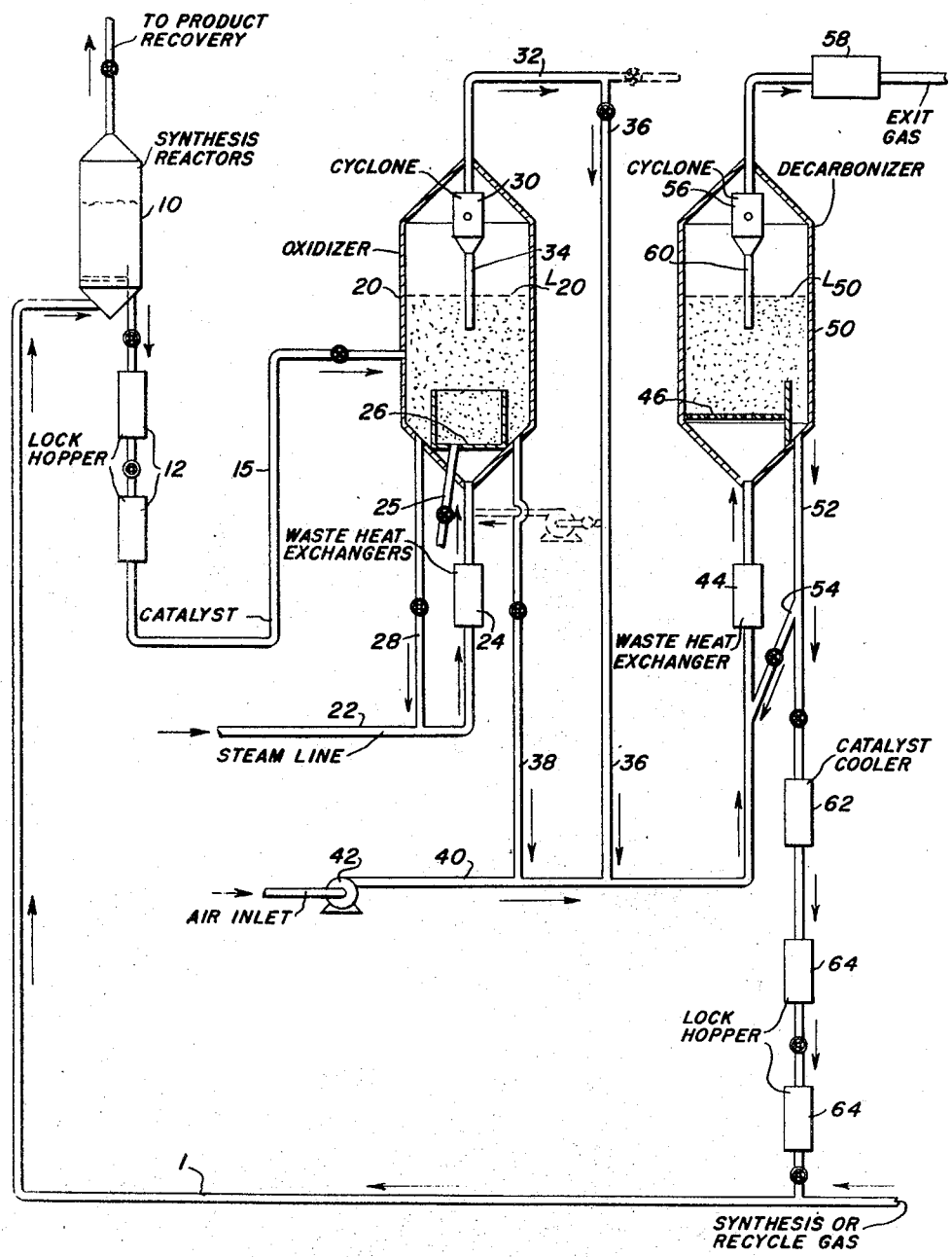

2,515,245

UNITED STATES PATENT OFFICE 2,515,245

PROCESS OF REGENERATING A FLUIDIZED FISCHER-TROPSCH CATALYST

William J. Mattox, Baton Rouge, La., assignor to Standard Oil Development Company, a corporation of Delaware Application June 11, 1947, Serial No. 754,027

3 Claims. (Cl. 252—417)

This invention relates to the catalytic conversion of carbon oxides with hydrogen to form valuable synthetic products. The invention is more particularly concerned with an improved method of employing and reconditioning finely divided catalysts having a high activity and selectivity for the formation of normally liquid hydrocarbons in the catalytic conversion of carbonmonoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high antiknock value, iron-type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties, particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which can not be readily removed by conventional methods of synthesis catalyst regeneration such as extraction, reduction, steam-treating or the like.

These carbon deposits, when allowed to accumulate, weaken the catalyst structure, probably due to carbide formation which leads to rapid catalyst disintegration, particularly in fluid operation. The reduction of the true density of the catalyst resulting from its high content of low-density carbon coupled with the rapid disintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

Prior to the present invention it has been suggested to reduce the carbon content of the catalyst of this type by withdrawing the carbonized material from the synthesis reactor and subjecting it either to a destructive hydrogenation treatment with hydrogen or to a combustion treatment with free oxygen-containing gases to remove carbon either in the form of volatile hydrogenation products or of carbon oxides. These treatments require a careful control of all regeneration conditions in order to prevent undesirable changes of the active catalyst component taking place during the decarbonization treatment. For example, when destructively hydrogenating the carbonized catalyst the catalyst itself may be reduced beyond its optimum state of oxidation which may lead to increased carbon formation in the synthesis reactor. Removal of the carbon by combustion with free oxygen-containing gases may either excessively oxidize the catalyst or lead to undesired physical changes such as agglomeration due to sintering, etc. Also, the combustion temperatures and oxygen requirements are usually excessive if substantially complete carbon removal is desired.

The present invention overcomes the aforementioned difficulties and affords various additional advantages. These advantages, the nature of the invention and the manner in which it is carried out will be fully understood from the following description thereof read with reference to the accompanying drawing.

In accordance with the present invention catalyst carbonized in the synthesis of hydrocarbons from CO and H₂ is subjected to an oxidizing treatment in at least two stages. In the first oxidizing stage the catalyst is exposed to mild oxidizing conditions of temperature, pressure and composition of the oxidizing atmosphere so as to accomplish a controlled oxidation of the active metal component of the carbonized catalyst without an appreciable combustion of carbon taking place. The mildly oxidized carbonized catalyst from the first oxidizing stage is subjected in a second oxidizing stage to oxidation conditions of temperature, pressure and composition of oxidizing atmosphere, adapted to cause combustion of the carbon on the catalyst to the desired degree of decarbonization without an appreciable further oxidation of the active metal component of the catalyst.

Steam and/or carbon dioxide may be used as oxidizing gases in the first oxidation zone while oxygen, air, or air diluted with $CO_2$ or steam are suitable oxidizing gases for the second oxidation stage. The oxidizing conditions of temperature and gas composition in the first oxidation stage are preferably so controlled that the partial pressure ratio of oxidizing to reducing gas is slightly above the equilibrium value at the temperature employed. More specifically if using $CO_2$ as the oxidizing gas the partial pressure ratio of $CO:CO_2$ should be slightly lower than .54 for an oxidation temperature of 550° F. When using steam as the oxidizing gas the partial pressure ratio of $H_2:H_2O$ should be slightly lower than 27 for a temperature of 550° F. Actual oxidation temperatures in the first oxidation stage may fall within the approximate range of 500°–1100° F. and are preferably maintained at about 600° to 800° F. At these temperatures the $CO:CO_2$ partial pressure ratio may be between about 0.01 and 0.6 and the partial pressure ratios of $H_2:H_2O$ between about 0.5–27 depending on the exact temperature. If mixtures of steam and $CO_2$ are used as oxidizing gases care should be taken to maintain the partial pressure of the individual constituents within these ranges.

The oxidation conditions in the second stage may be more severe to obtain substantial removal of carbon from the preoxidized catalyst. No particularly careful control of the oxidizing atmosphere is required as long as sufficient oxygen is made available to remove the desired amount of carbon because, as a result of the preliminary oxidation of the metal component of the catalyst in the first oxidation stage, carbon will burn in preference to the further oxidation of the metal component. Suitable oxidation temperatures in the second stage may fall within the approximate limits of 700°–1400° F. and may be high enough to cause at least a superficial sintering of the catalyst particles in the second stage. The catalyst decarbonized in this manner may be directly returned to the synthesis reaction or subjected to a reducing treatment, if desired, prior to its reuse.

The advantages achieved by the process of the invention are manyfold. The first mild oxidation stage permits the recovery of at least a major proportion of heavy hydrocarbons and waxes adsorbed on the catalyst in addition to the fixed carbon deposits. Highly pyrophoric metal components of the carbonized catalyst are reoxidized in the first stage under conditions which do not result in sintering, thereby conditioning the catalyst against an undesired degree of sintering, agglomeration or other changes in particle size or physical or chemical properties during the treatment with free oxygen-containing gases in the second stage. The metallic constitutents of the catalyst may not be completely converted to their oxides in the first oxidation stage but merely to a controlled, limited extent sufficient to result in the preferential oxidation of carbon in the second stage with oxygen-containing gases. The catalyst thus mildly oxidized and decarbonized may be suitable for return to the synthesis stage without intermediate reduction. Depending on whether carbon dioxide or steam is used as the oxidizing gas in the first oxidation zone, the off gases from this zone are rich in carbon monoxide or hydrogen and may be added to the synthesis feed gas to adjust it $H_2:CO$ ratio. The return of unreduced mildly oxidized catalyst directly from the second oxidation stage to the synthesis stage may improve the yield of oxygenated compounds and assist in the retardation of carbon formation in the synthesis stage. The second oxidation stage represents a convenient means for the sintering of synthesis catalyst such as pyrites ashes or other iron catalysts at high carbon concentrations in an economical manner. Operating advantages include decreased oxygen requirements, considerable latitude in operating pressures resulting in lower compression cost, and lower oxidation temperatures, as compared with conventional single stage oxidation.

The process of the present invention may be applied to operations employing the usual types of hydrocarbon synthesis catalyst such as those containing iron, cobalt, thorium, manganese, magnesium, copper, zinc, cerium, zirconium, etc. or oxides of these or other suitable metals in combination with various other promoting or stabilizing compounds in fixed, moving or fluidized beds. The invention is, however, of particular advantage when applied to iron type catalysts promoted with alkali metal compounds such as carbonates, hydroxides, oxides, chlorides, or fluorides of sodium or potassium, employed in the form of dense, turbulent fluidized beds of finely divided solids because procedures of this type involve the most serious carbonization difficulties. Examples for such iron catalysts are reduced sintered pyrites ashes, red iron oxide, magnetite containing about 1.5% of alumina etc., promoted with small amounts, say about .5–5%, of alkali-metal promotors.

Having set forth its general nature and objects, the invention may be best understood from the subsequent more specific description in which reference will be made to the accompanying drawing which illustrates a system suitable for carrying out a preferred embodiment of the invention.

Referring now in detail to the drawing the system illustrated therein essentially consists of a conventional fluid synthesis reactor 10, an oxidizer 20 and a decarbonizer 50, whose functions and cooperation will be forthwith explained using the reconditioning of an iron type synthesis catalyst as an example. It should be understood, however, that the system illustrated in the drawing may be applied in a generally analogous manner to the treatment of other carbonizing synthesis catalysts.

In operation, synthesis reactor 10 contains a dense, turbulent fluidized mass of iron catalyst such as sintered pyrites ash promoted with about 1.5% of potassium fluoride, synthesis feed gas being supplied from line 1 to reactor 10 at a suitable synthesis pressure of 5 to 50 atmospheres, preferably 10-20 atmospheres. The synthesis temperature may be maintained within the approximate limits of 500° to 800° F. preferably between about 550° and 700° F. by conventional methods of heat removal (not shown). Details of the operation of fluid synthesis reactors using iron catalyst are well known and need not be further specified here.

As stated before carbon deposits form on the catalyst in reactor 10, and in about 100 hours as much as 50 lbs. of carbon may be deposited on each 100 lbs. of catalyst. This will tend to diminish the activity of the catalyst and also cause its physical disintegration so that fines in excessive quantities will be formed. If this condition is not corrected the density of the catalyst phase will drop rapidly and the entire catalyst will be eventually blown out of reactor 10. The present invention is designed to correct this difficulty.

In accordance with the invention, carbonized catalyst, before it reaches a degree of carbonization conducive to excessive disintegration, is withdrawn downwardly from reactor 10 through a system of lock hoppers 12 and passed through line 15 to oxidizer 20. Simultaneously an oxidizing gas such as steam or carbon dioxide is supplied to oxidizer 20 through line 22, heat exchanger 24 and a distributing device such as grid 26. The superficial velocity of the oxidizing gas entering oxidizer 20 through grid 26 is so controlled that the catalyst within oxidizer 20 is maintained in the form of a dense, turbulent fluidized bed having an upper level $L_{20}$ and an apparent density of about 15 to 150 lbs., preferably about 50 to 100 lbs. per cu. ft. Gas velocities of about 0.3 to 10 ft. per second, preferably about 0.5 to 3 ft. per second are suitable for these purposes at catalyst particle sizes within the approximate limits of 50 to 200 mesh.

The amount of oxidizing gas required, of course, depends on the amount of catalyst to be oxidized and the degree of oxidation desired. More specifically when an iron catalyst is to be oxidized from an oxygen content of about 10% to an oxygen content of about 20%, about 0.1 to 2 lbs. of steam or about 1.2 to 10 normal cu. ft. of carbon dioxide should be supplied to oxidizer 20 per lb. of catalyst to be treated. The oxidation temperature in oxidizer 20 should be so controlled that oxidation of the iron will take place without removing appreciable amounts of carbon from the catalyst. Temperatures of this level, say about 700° to 1000° F. may be maintained by any conventional means of heat supply or withdrawal. For example, heat may be supplied as preheat of the oxidizing gas, absorbed in heat exchange with off gases and/or hot catalyst withdrawn from decarbonizer 50 which is normally operated at temperatures considerably higher than those required in oxidizer 20. As an additional or alternative means of heat supply to oxidizer 20 a limited amount of a free oxygen-containing gas such as air and/or oxygen may be introduced through line 25 into the bottom portion of oxidizer 20 to burn a limited amount of carbon in this bottom portion and to generate heat of combustion thereby. Heat may be withdrawn by circulating the catalyst from oxidizer 20 through a bottom draw-off pipe 28, oxidizing gas feed line 22 and heat exchanger 24 back to oxidizer 20. By these means of temperature control and by a proper adjustment of the feed rate of the oxidizing gas, the conditions within oxidizer 20 may be kept just sufficiently on the oxidizing side of the oxidation-reduction equilibrium to accomplish the desired preferential catalyst oxidation within oxidizer 20.

Spent oxidizing gas which may contain suspended catalyst particles is withdrawn overhead from level $L_{20}$ through gas-solids separator 30 and may be discarded through line 32. Catalyst separated in separator 30 may be returned to oxidizer 20 through line 34. If desired, a portion or all of the spent oxidizing gas may be mixed with the synthesis gas in line 1 to adjust its $H_2$:CO ratio or the heat content of the spent oxidizing gas may be utilized in the system in any desired manner. It may also be desirable to use a portion of these spent gases to dilute the oxygen content of the oxidizing gas supplied to decarbonizer 50. This may be done by way of branch line 36.

Oxidized catalyst is withdrawn from oxidizer 20 through a bottom draw-off line 38 and passed through line 40 wherein it is suspended in a free oxygen-containing gas, such as air, supplied by blower 42. The dilute suspension of oxidized catalyst in air, formed in line 40 is passed, if desired, through a waste heat exchanger 44 and grid 46 into decarbonizer 50 to form a dense, turbulent fluidized mass of catalyst therein substantially as described in connection with oxidizer 20. The amount of air supplied to and the temperature within decarbonizer 50, are so controlled that a substantial proportion of the carbon deposited on the catalyst is burned off. The absolute amounts of air required depend, of course, on the amount of carbon to be removed. If it is desired, for example, to reduce the carbon content of the iron catalyst oxidized in oxidizer 20 as stated before, from about 20% by weight to about 5% by weight of catalyst the amount of air supplied should be about 11 to 40 normal cu. ft. per lb. of catalyst at a combustion temperature of about 1100° to 1400° F.

The combustion reaction in decarbonizer 50 is strongly exothermic and heat must be withdrawn therefrom. While this may be accomplished by any conventional means of heat removal, I prefer to circulate catalyst downwardly from decarbonizer 50 through pipes 52 and 54 to waste heat exchanger 44 and from there back to decarbonizer 50.

Spent oxidizing gas which may contain suspended catalyst particles is withdrawn upwardly from level $L_{50}$, freed of suspended catalyst in gas solids separator 56 and vented through a heat exchanger 58 which is preferably used to preheat the oxidizing gas supplied through line 22 to oxidizer 20. Solids separated in separator 56 may be returned to decarbonizer 50 through return pipe 60.

Oxidized and decarbonized catalyst is withdrawn downwardly from decarbonizer 50 through bottom draw-off line 52 and heat exchanger 62 to be passed via a lock hopper system 64 to synthesis gas feed line 1. The catalyst suspended in the synthesis gas is returned to synthesis reactor 10 for reuse. Heat exchanger 62 is preferably used to supply heat to the oxidizing gas fed through line 22 to oxidizer 20.

The system illustrated by the drawing permits of various modifications. Instead of lock hopper systems 12 and 64, other conventional means for conveying finely divided solids between treating zones maintained under different pressures may be used such as aerated standpipes, pressurized mechanical conveyors or the like. Catalyst withdrawal pipes 28, 38, 52 and 54 may likewise have the form of aerated standpipes. Oxidizer 20 and decorbonizer 50 may be maintained at substantially the same pressure as synthesis reactor 10. However, considerable savings in compression cost may be made when either both oxidizer 20 and decarbonizer 50 or at least decarbonizer 50, are operated at lower pressures such as atmospheric to about 5 atmospheres, which is made possible by the specific type of solids circulating means described above. It will be readily understood that the carbon concentration in reactor 10 may be maintained substantially constant at any desired level by circulating the catalyst substantially continuously through a system of the type illustrated by the drawing. At the conditions specified for the above exemplary operation, conditioning of about 5-30% of the total catalyst hold-up in synthesis reactor 10 per hour in accordance with the present invention will be sufficient for this purpose. In most cases, it will be desirable to cool the catalyst withdrawn through line 52 at least to or below the synthesis temperature in reactor 10 prior to the return of this catalyst to the synthesis reaction.

Other modifications of the system shown in the drawing will occur to those skilled in the art without deviating from the spirit of the invention.

While the foregoing description and exemplary operations have served to illustrate specific applications and results of the invention, other modifications obvious to those skilled in the art are within the scope of the invention. Only such limitations should be imposed on the invention as are indicated in the appended claims.

I claim:

1. The process of decarbonizing iron component synthesis catalysts carbonized in the catalytic conversion of carbon monoxide with hydrogen, which comprises contacting said carbonized catalyst with an oxidizing gas selected from the group consisting of steam and $CO_2$ at a relatively mild oxidizing temperature of about 500°-1100° F. and an oxidizing atmosphere conducive to the oxidation of the iron component of said catalyst in preference to a combustion of carbon on said catalyst so as to oxidize said iron component without substantial decarbonization, and contacting said oxidized catalyst with a free oxygen-containing gas at relatively severe temperatures of about 700°-1400° F. and an oxidizing atmosphere conducive to a combustion of said carbon in preference to further oxidation of said iron component, so as to burn off at least a substantial portion of said carbon from said catalyst without substantial further oxidation of said iron component.

2. The process of claim 1 in which said first named oxidizing atmosphere is so controlled that the partial pressure ratio of $CO:CO_2$ therein lies between 0.01 and 0.6 and the partial pressure ratio of $H_2:H_2O$ falls between 1.0 and 27.

3. A process of conditioning an iron type finely-divided catalyst utilized in the synthesis of hydrocarbons from carbon monoxide and hydrogen, which catalyst is maintained in a synthesis zone in the form of a dense fluidized bed and during which synthesis the catalyst becomes carbonized, which comprises withdrawing carbonized catalyst from said synthesis zone, contacting the withdrawn catalyst in an oxidizing zone while maintained in the form of a fluidized bed with an oxidizing gas at temperatures between about 500° and 1100° F. and while under a pressure substantially lower than that prevailing in said synthesis zone whereby the catalyst is oxidized but is not substantially decarbonized, withdrawing oxidized catalyst from said last named zone, procuring said catalyst in the form of a dense fluidized mass in a decarbonization zone and subjecting said catalyst in said last named zone to the influence of a gas selected from the group consisting of carbon dioxide and steam at temperatures within the range of from about 700° to 1400° F. for a sufficient period of time to burn off a substantial portion of the carbon from said catalyst without effecting further oxidation thereof, withdrawing catalyst of reduced carbon content from said decarbonization zone and returning said catalyst to said conversion zone.

WILLIAM J. MATTOX.

REFERENCES CITED

The following references are of record in the file of this patent:

UNITED STATES PATENTS

| Number | Name | Date |
|---|---|---|
| 2,183,146 | Michael | Dec. 12, 1939 |
| 2,220,261 | Michael et al. | Nov. 5, 1940 |
| 2,261,151 | Fast | Nov. 4, 1941 |
| 2,273,864 | Houdry | Feb. 24, 1942 |
| 2,284,603 | Belchetz et al. | May 26, 1942 |
| 2,327,175 | Conn | Aug. 17, 1943 |
| 2,330,710 | Hemminger | Sept. 28, 1943 |
| 2,348,418 | Roesch et al. | May 9, 1944 |
| 2,367,694 | Snuggs | Jan. 23, 1945 |
| 2,383,636 | Wurth | Aug. 28, 1945 |
| 2,390,323 | Peck | Dec. 4, 1945 |
| 2,393,909 | Johnson | Jan. 29, 1946 |
| 2,394,710 | McAfee | Feb. 12, 1946 |
| 2,398,739 | Greensfelder et al. | Apr. 16, 1946 |
| 2,414,002 | Thomas et al. | Jan. 7, 1947 |
| 2,455,419 | Johnson | Dec. 7, 1948 |